United States Patent
Carraway et al.

(10) Patent No.: US 11,645,920 B2
(45) Date of Patent: May 9, 2023

(54) SECURE UNMANNED AERIAL VEHICLE FLIGHT PLANNING

(71) Applicant: T-Mobile USA, Inc., Bellevue, WA (US)

(72) Inventors: Precia Carraway, Bellevue, WA (US); Ali Daniali, Lynnwood, WA (US)

(73) Assignee: T-Mobile USA, Inc., Bellevue, WA (US)

(*) Notice: Subject to any disclaimer, the term of this patent is extended or adjusted under 35 U.S.C. 154(b) by 247 days.

(21) Appl. No.: 16/417,463

(22) Filed: May 20, 2019

(65) Prior Publication Data
US 2020/0372808 A1 Nov. 26, 2020

(51) Int. Cl.
| | |
|---|---|
| *G08G 5/00* | (2006.01) |
| *H04L 9/32* | (2006.01) |
| *H04W 4/40* | (2018.01) |
| *H04W 12/069* | (2021.01) |
| *H04L 9/00* | (2022.01) |
| *H04W 4/029* | (2018.01) |

(52) U.S. Cl.
CPC ......... *G08G 5/0013* (2013.01); *G08G 5/0039* (2013.01); *G08G 5/0069* (2013.01); *H04L 9/3236* (2013.01); *H04W 4/40* (2018.02); *H04W 12/069* (2021.01); *H04L 9/50* (2022.05)

(58) Field of Classification Search
CPC .. G08G 5/0013; G08G 5/0039; G08G 5/0069; H04W 4/40; H04W 12/069; H04L 9/3236; H04L 2209/38
See application file for complete search history.

(56) References Cited

U.S. PATENT DOCUMENTS

| | | | |
|---|---|---|---|
| 9,855,785 B1* | 1/2018 | Nagelberg | G06K 19/06028 |
| 10,583,845 B1* | 3/2020 | Nicholls | H04W 4/38 |
| 10,652,919 B1* | 5/2020 | Li | H04L 1/1887 |
| 2017/0285633 A1* | 10/2017 | Poornachandran | G08G 5/0069 |
| 2018/0068567 A1* | 3/2018 | Gong | G08G 5/0034 |
| 2018/0072265 A1* | 3/2018 | Samadani | B60K 28/04 |
| 2019/0068762 A1* | 2/2019 | Liu | H04L 9/0618 |
| 2019/0087576 A1* | 3/2019 | Olson | G06F 7/00 |
| 2019/0228665 A1* | 7/2019 | Bosworth | H04L 67/104 |
| 2019/0349426 A1* | 11/2019 | Smith | H04L 45/20 |

* cited by examiner

*Primary Examiner* — Aniss Chad
*Assistant Examiner* — Madison R Hughes
(74) *Attorney, Agent, or Firm* — Han Santos, PLLC

(57) ABSTRACT

Techniques are described herein for securely managing and tracking UAV flight paths. The techniques include receiving a flight plan from an unmanned aerial vehicle (UAV). The UAV comprises a memory unit for storing a key associated with the UAV. The key enables the UAV to add one or more blocks on a blockchain distributed ledger, wherein the flight plan comprises one or more legs of a flight path. The techniques further include receiving, from the UAV, a block indicating that the UAV completed at least one leg of the flight path. The block can include a hash associated with the at least one leg of the flight path. The block is validated based at least on the hash associated with the at least one leg of the flight path and if the block is validated, a success notification is transmitted to the UAV to continue executing the flight plan.

17 Claims, 8 Drawing Sheets

SECURE UNMANNED AERIAL VEHICLE FLIGHT PLANNING

BACKGROUND

Unmanned aerial vehicles (UAVs) are generally remotely controlled. UAVs include drones that are operated by hobbyist drone pilots and commercial drone pilots. While UAVs are generally subject to Federal Aviation Administration (FAA) regulations similar to the regulations that piloted aircrafts are required to operate under, civilian UAVs are under-regulated. As a result, civilian UAVs pose risks for hacking and may be susceptible to cyber-attacks. As technology evolves and UAVs become increasingly available, UAV-led cyber-attacks may become more common.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
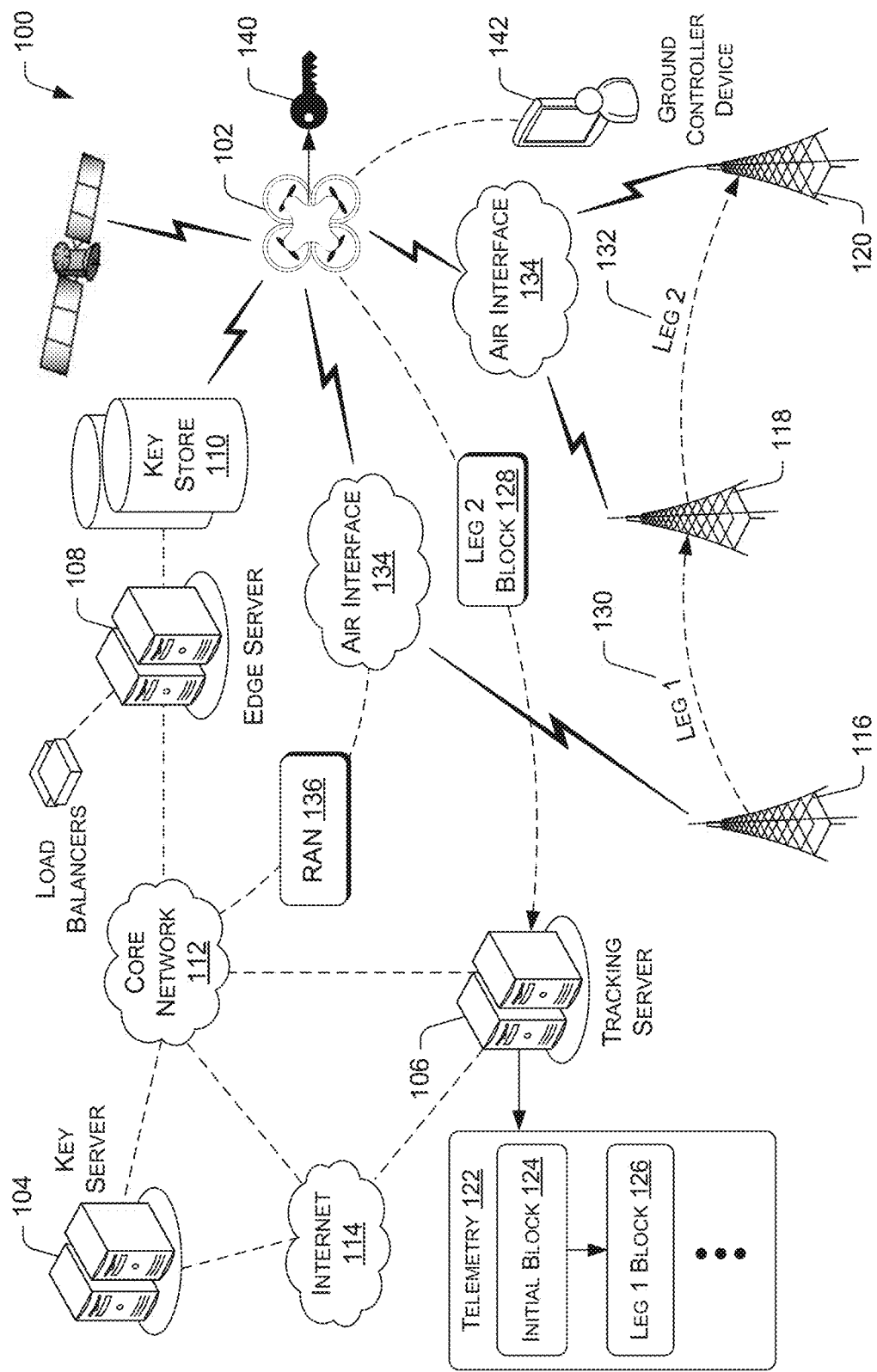
FIG. 1 illustrates an example network architecture in which a tracking server communicates with a UAV over a network to track the position of the UAV while executing a flight plan.

This disclosure is directed to techniques for securely managing and tracking UAV flight paths, including use of blockchain technology. A blockchain is a data structure comprising a growing list of records or transactions, called blocks, which are cryptographically linked to each other. Each block can comprise at least a cryptographic hash of the previous block, a timestamp, and transaction data. By linking blocks by their cryptographic hashes, a blockchain is resistant to modification of the data once the data has been added as a block. Thus, data that has been added to a blockchain can be considered to be immutable. Furthermore, the integrity of the data in the blockchain can be verified by any computer system having access to the blockchain.

In some aspects, the blockchain may be accessible only to authorized computer systems. For example, the blockchain may be accessible to computer systems possessing appropriate cryptographic keys assigned to them by an authoritative party. In this way, a computing system may be able to add a block to the blockchain if the computing system possesses a cryptographic key that is assigned to it by an authoritative entity. In one instance, an authoritative entity can be a telecommunications service provider or a third party operating with the telecommunications service provider. Having introduced blockchain, example embodiments of the system architecture include entities that may operate and utilize a distributed ledger that is based on blockchain technology to track one or more UAVs. The implementation of the distributed ledger may be used to operate UAVs securely. Additionally, the distributed ledger may be used as evidence of compliance with various regulatory requirements such as FAA regulatory requirements.

Individual UAVs may be equipped with a communication device such as a transceiver and a subscriber identity module (SIM) card. In some embodiments, the SIM may be an embedded SIM (eSIM). Each UAV is configured to fly in accordance with a flight plan that may be uploaded to the tracking server. A flight plan defines a flight path for a UAV across a set of segments called legs. In one instance, the various legs of a UAV's flight path may correspond to the geolocations of base stations. Accordingly, one or more base stations may be used to track and to verify that a UAV has initiated, completed, or passed through a leg of a flight path in accordance with a flight path. In some instances, the various legs of a UAV's flight path may correspond to other infrastructures, such as a geosynchronous satellite.

Additionally, a key server may be implemented for securely generating one or more cryptographic keys for the UAV and each of the base stations. In some embodiments, the SIM card that is installed on the UAV may store a cryptographic key that is specific to the UAV. In the case of eSIMs, the key may be deployed over the air (OTA). The keys for the UAV may be used to view blocks on a blockchain distributed ledger and to insert blocks onto the blockchain distributed ledger mid-flight. The keys for the base stations may be prepositioned on edge servers in communication with the UAV. In some aspects, each cryptographic key enables its corresponding base station to view blocks on the blockchain distributed ledger and to insert blocks onto the blockchain distributed ledger.

A UAV may upload a flight plan to the tracking server, which can comprise the blockchain distributed ledger. In this way, the tracking server is configured to receive, from the UAV, telemetry (i.e., one or more blocks) to track and record the progress of the UAV's flight plan on the blockchain. In this way, the blockchain structure may be used to verify the progress of the UAV via the uploaded flight plan and detect any deviations from flight plans. Before initiating the flight plan, the UAV and the key server may perform an initial key exchange. Upon completing the initial key exchange, the UAV may insert one or more first blocks (e.g., genesis blocks) onto the blockchain distributed ledger. The one or more first blocks may be associated with a hash value.

Inserting the one or more first blocks onto the blockchain distributed ledger initiates the tracking process. As the UAV completes a leg of a flight path in accordance with the flight plan as detected by a base station, the UAV receives, from an edge server, a key associated with the base station of the leg. The UAV can then generate one or more second blocks including the hash value from the first blocks, thereby recording the UAV's progress at the leg of the flight path, which is added to the blockchain using the key associated with the base station of the leg. This process continues until the UAV completes the flight plan.

If the UAV veers off the flight path, for any reason (e.g., inclement weather conditions, obstacles, handover to a different base station, etc.), then the UAV may automatically make a flight correction mid-flight and/or upload an updated flight plan to the tracking server. The updated flight plan can include an updated flight path. Upon receiving the updated flight plan, the tracking server may send an acknowledgment to the UAV allowing the UAV to execute the updated flight plan. Alternatively, the tracking server may send a failure protocol to suspend the UAV from executing the flight plan and/or the updated flight plan.

Additionally, if one or more blocks are invalid (e.g., the UAV flies over a base station that is not included in a leg of a flight path), the tracking server may trigger one or more failure protocols. For example, the failure protocols can include directing the UAV to land, sending the UAV to a target location (e.g., GPS coordinates), and/or so forth. The techniques described herein may be implemented in a number of ways. Example implementations are provided below with reference to the following figures.

Example Network Architecture

FIG. 1 illustrates example network architecture for implementing defense techniques against cyber-attacks on UAVs. The architecture may include one or more UAVs, such as the UAV 102, in a wireless communication network 100. Accordingly, it is noted that references to one UAV as used in this application and the appended claims should generally be construed to mean one or more or at least one UAV unless specified otherwise or clear from context to be directed to a singular form. The UAV 102 can communicate with an access network (e.g., a radio access network (RAN) 136, an access point (AP), etc.) over a physical communications interface or network access technologies. For example, the air interfaces 134 may serve the UAV 102 over a local wireless connection. The air interfaces 134 can comply with a given cellular communications protocol. For example, the network 100 can implement 2G, 3G, 4G, 5G, long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), a local area network (LAN), a wide area network (WAN), and/or a collection of networks (e.g., the Internet 114).

The RAN 136 can include a plurality of APs that serve the UAV 102 over air interfaces 134. An AP in the RAN 136 can be referred to as an access node (AN), a base station, Node B, evolved Node B (eNode B), and/or so forth. In the network 100 as illustrated in FIG. 1, the individual base stations 116-120 are associated with one or more cryptographic keys. In various embodiments, other network nodes may be associated with one or more cryptographic keys. An AP can be a terrestrial access point or a satellite access point. The RAN 136 connects to a core network 112 and can mediate an exchange of packet-switched (PS) data with external networks such as the Internet 114. The Internet 114 can include a number of routing agents and processing agents (not shown). In various embodiments, the AP may be separate from the RAN 136. The AP can be connected to the Internet 114 independent of the core network 112. The core network 112 can provide one or more communications services (e.g., voice-over-Internet Protocol (VoIP) sessions, push-to-talk (PTT) sessions, group communication sessions, etc.) for the UAV 102.

The network 100 further comprises a key server 104 and a tracking server 106. The key server 104 and the tracking server 106 may include general-purpose computers, such as desktop computers, tablet computers, laptop computers, servers (e.g., on-premise servers), or other electronic devices that are capable of receiving input, processing the input, and generating output data. The key server 104 and/or the tracking server 106 may store data in a distributed storage system. Further, the key server 104 and/or the tracking server 106 can be implemented as a plurality of separate servers that may be grouped together and presented as a single computing system. Each physical machine of the plurality of physical machines may comprise a node in a cluster. The key server 104 and/or the tracking server 106 may also be in the form of virtual machines, such as virtual engines (VE) and virtual private servers (VPS). The key server 104 and/or the tracking server 106 can be operated by a telecommunications service provider and/or a third party working with the telecommunications service provider.

The key server 104 may securely generate one or more cryptographic keys, wherein the individual keys are associated with corresponding base stations. In some aspects, the key server 104 can include a code generator for generating one or more cryptographic keys. The code generator may include a component for generating unique cryptographic keys, such as a random number generator or an entropy engine, wherein the random number generator may be implemented as dedicated hardware, or as a software algorithm. In the illustrated embodiment, the key server 104 generates a first key for the first base station 116, a second key for the second base station 118, and a third key for the third base station 120. While three base stations 116-120 are illustrated for purposes of this example, the network 100 could include any number of a plurality of base stations and/or nodes. Each of the keys may allow the respective base stations to access a distributed ledger, thereby enabling the base station to read blocks from and insert blocks into the distributed ledger. One implementation of the distributed ledger in FIG. 1 is shown at the tracking server 106.

The key server 104 can send the keys to one or more edge servers 108. Thus, the keys are prepositioned in one or more edge servers 108, which comprise a key store 110 for storing the keys received from the key server 104. The edge server 108 can physically be located near base stations 116-120. Additionally, or alternatively, the edge server 108 can serve virtually in the network clouds. The edge server 108 may cache content (i.e., one or more cryptographic keys) from the key server 104 to make it available in a more geographically or logically proximate location to the UAV 102.

The key server 104 may communicate with the tracking server 106. The tracking server 106 may provide UAV tracking services for determining a UAV's progress while traveling on a planned flight path. The tracking server 106 is configured to manage a UAV's flight plan and track the UAV's flight progress, using a plurality of base stations 116-120 that can each store at least a portion (i.e., a block) of the blockchain distributed ledger. In various embodiments, the tracking server 106 receives, from the UAV 102, a flight plan that includes one or more legs of a flight path. The legs of the flight path can correspond to the individual base stations 116-120. For instance, the first leg 130 of the flight path is the distance between the first base station 116 and the second base station 118. The second leg 132 of the flight path is from the second base station 118 to the third base station, and so on. The UAV 102 may be preprogrammed to execute a flight plan that may be locally stored on the UAV 102. Additionally, or alternatively, the UAV 102 may receive a flight plan from a ground controller device 142 in communication with the UAV 102. In the latter scenario, the ground controller device 142 may directly upload the flight plan to the tracking server 106. The ground controller device 142 can comprise various networked enabled devices that are capable of receiving input, processing the input, and generating output data. The ground controller device 142 may be operated by a drone pilot.

However, before uploading the flight plan to the tracking server 106, the UAV 102 may first be registered with the tracking server 106 to enable the UAV 102 to communicate within the wireless communications network 100. The UAV 102 illustrated in FIG. 1 may include a transceiver and SIM card. In some embodiments, the SIM card that is installed on a UAV may store a cryptographic key 140 that is specific to the UAV 102. The key 140 may be generated by the key server 104. In various embodiments, the SIM card may comprise an eSIM card. In this case, the key 140 may be deployed OTA. In yet other embodiments, the SIM card may be a drone-specific SIM card. In one aspect, the UAV 102 may send the Integrated Circuit Card Identifier (ICCID) associated with the SIM card, to the tracking server 106, during the registration process.

Additionally, or alternatively, the UAV 102 may upload a unique identifier associated with the UAV 102 itself such as the FAA-issued registration number. The FAA-issued registration identification number may be associated with drone identification data. The UAV 102 may also upload a subscriber indicia of a user (i.e., the drone pilot) associated with the UAV 102. The subscriber indicia may include a user identifier, the International Mobile Equipment Identity (IMEI) number of the UAV 102, or other indicia to allow a mobile network operator (MNO) of the wireless communication network 100 to identify the user as a current subscriber. The MNO may then associate the ICCID or the FAA-issued registration identification number of the UAV 102 with a current subscriber account for billing or for providing other services associated with the use of the UAV 102.

Upon registering the UAV 102 and uploading a flight plan to the tracking server, the UAV 102 may first exchange keys with the key server 104. The flight plan may be cryptographically protected by an encryption component of the tracking server 106. In addition, the tracking server 106 may generate a unique identifier that is associated with the flight plan. In this regard, tracking server 106 may also include a generation component. In various embodiments, the tracking server 106 may generate a group identifier that is associated with the flight plan received from a specific UAV 102. For instance, the tracking server 106 may generate an alphanumeric group flight plan code beginning with A-0000 and ending with A-9999 for flight plans received from a first UAV. Additionally, the tracking server 106 may generate a group flight plan code beginning with B-0000 and ending with B-9999 for flight plans received from a second UAV. Thus, the group flight plan code A-0000 identifies the first UAV and the group flight plan code B-9999 identifies the second UAV.

Various key exchange schemes may be implemented (e.g., Diffie-Hellman key exchange, public key infrastructures (PKIs), asymmetric key encryption scheme, Digital Signature Algorithm (DSA), Rivest-Shamir-Adleman (RSA)). Upon receiving an initial key from the key server 104, the UAV 102 may send an acknowledgement to the key server 104 to confirm the receipt of the initial key. In response to the initial key exchange, the UAV 102 may generate an initial block 124 (i.e., a genesis block), which is sent to the tracking server 106 and inserted onto the blockchain distributed ledger. Thus, the UAV's 102 flight progress can be grouped into blocks that may be propagated to the whole network before subsequent blocks are produced during the execution of a flight plan.

Blocks are added to the blockchain based on a predefined protocol for validating new blocks. Each block references and builds off of a previous block using cryptographic functions called hashes. A hash function takes arbitrary digital data as input and returns a fixed length pseudo random number as output. This hash function value can generally fall within a range set by the predefined protocol. Tying each block to its previous block with these hash functions in a consecutive order generates a chain, thereby creating a blockchain (i.e., a ledger), containing all accepted transactions. A blockchain thus forms a public record of all transactions. Each block within the blockchain can be associated with a block number or a transaction hash. Additionally, the blocks can include, without limitation, data specific to the UAV 102 (e.g., IMEI, FAA-issued registration number, etc.), one or more date/time stamps associated with an event, the health status of the UAV, the identifier associated with the flight plan, duration of flight between each leg of the flight path, a cryptographic hash of the previous block, and/or so forth. The date/time stamps can indicate when the UAV initiated and/or completed the flight plan, initiated and/or completed a leg of the flight path of the flight plan, updated a flight plan, made a flight correction, executed a failure protocol, and/or so forth.

Depending upon embodiments, the blockchain may be public or private. In the latter case, the blockchain may be accessible only to those possessing the appropriate cryptographic keys. Thus, a UAV 102 is permitted to add a block to the blockchain if the UAV 102 possesses a cryptographic key 140 that is assigned to it by the key server 104 or another authoritative entity. In various embodiments, various entities that can include different companies or different divisions within one company can utilize the distributed ledger to track the progress of the UAV 102 during the execution of a flight plan.

Upon receiving the initial block 124 (i.e., telemetry 122) from the UAV 102, the tracking server 106 validates the block 124 and adds the block 124 to the blockchain. In one aspect, the initial block 124 can include data that is signed with the UAV's private key, which is then run through a hash function. The tracking server 106 may use the UAV's public key to verify whether the signature is valid (i.e., signed by the UAV that is the owner of the private key). In various implementations, the tracking server 106 can include a blockchain module to communicate with other peer computing systems or nodes (e.g., base stations 116-120, UAV 102, etc.) and for maintaining a copy of the distributed ledger. For instance, the blockchain module may include software that defines the protocol for block validation. The software may also define the format and structure of the distributed ledger and manage the addition of new blocks to the ledger. In some aspects, other components of the network such as the base stations 116-120 and the UAV 102 may locally store a corresponding copy of the distributed ledger.

Additionally, the blockchain module may use the keys associated with the UAV 102 and the base stations 116-120 to verify the identity of the UAV 102 and the base stations 116-120, respectively, and to authorize the UAV 102 and/or the base stations 116-120 to access the distributed ledger, and to add blocks to the distributed ledger. Upon validating and adding the initial block 124, the tracking server 106 transmits a success notification to the UAV 102 to initiate the execution of the flight plan. As the name implies, in some aspects, the recording of the initial block 124 may be an initial record on the ledger that records the start of the flight plan that is uploaded to the tracking server 106. If the UAV 102 defers adding any blocks or entries to the ledger until after it has initiated a flight plan, then the UAV 102 may insert a block confirming that it has performed key exchange with the key server 104 before the start of the flight. In this way, various implementations may use fewer or more ledger entries to record a UAV's progress.

In the illustrated embodiment, the UAV 102 is configured to fly over the first leg 130 and the second leg 132 of a flight path of the flight plan. The first leg 130 is from the first base station 116 to the second base station 118. The second leg 132 is from the second base station 118 to the third base station 120. The UAV 102 can initiate a flight plan from the first base station 116 or from another starting point. If the first base station 116 is the starting point, the initial block 124 may indicate that the UAV 102 departed from the first base station 116. If the starting point is another location other than the first base station 116, the initial block 124 may indicate that the UAV 102 departed from the known starting point and a subsequent block may indicate that the UAV 102 arrived at the first base station 116 before flying over the first leg 130 of the flight plan. Alternatively, the UAV 102 may insert a block upon completing the first leg 130 of the flight plan and confirm that it flew over the first base station 116.

When the UAV 102 passes the first base station 116, the first base station 116 creates a transaction indicating that the UAV 102 is flying over the first base station 116. The transaction is signed with the base station's 116 private key and hashed. Additionally, the UAV 102 receives, from the edge server 108, a first public key associated with the first base station 116. The UAV 102 may utilize the base station's 116 public key to verify that the public key matches the digital signature. The UAV 102 transmits a block associated with the transaction to the tracking server 106. If the first base station 116 is the starting point, the block can comprise the initial block 124. The block 124 can record that the date/time stamps indicating when the UAV 102 arrived at the first base station 116 and departed from the first base station 116. Additionally, the block can indicate the health status of the UAV 102 when flying over the first base station 116. For example, the health status can include the battery charge level or the remaining flying time for the UAV 102. The keys associated with the first base station 116 and the UAV 102 can be used to validate the block against the flight plan. In one aspect, because the flight plan is uploaded to the tracking server 106, the tracking server 106 can use the public key associated with the first base station 116 to determine that the signature associated with the transaction in the block is valid if the hash value of the block falls within a predetermined range. If the tracking server 106 validates the blocks, the tracking server 106 may transmit a success notification to the UAV 102, permitting the UAV 102 to continue executing the flight plan.

When the UAV 102 passes the second base station 118, the second base station 118 creates a transaction indicating that the UAV 102 is flying over the second base station 118. The transaction is signed with the second base station's 118 private key and hashed. The UAV 102 receives, from the edge server 108, a second public key associated with the second base station 118. The UAV 102 may utilize the second public key to verify that the second public key matches the digital signature. The UAV transmits a block 126 associated with the transaction to the tracking server 106 recording its flight progress to the second base station 118 or the completion of the first leg 130 of the flight path. The block can record date/time stamps associated with events during the first leg 130 of the flight path and other data specific to the UAV 102 as described above. In response to receiving the block 126, the tracking server 106 uses the second public key associated with the second base station 118 to determine that the signature associated with the transaction in the block 126 is valid if the hash value of the block 126 falls within a predetermined range. If the tracking server 106 validates the block 126, the tracking server 106 may transmit a success notification to the UAV 102.

Upon receiving a success notification from the tracking server 106, the UAV 102 continues the flight plan and travels the next leg of the flight path or the second leg 132. When the UAV 102 passes the third base station 120, the third base station 120 creates a transaction indicating that the UAV 102 is flying over the third base station 120. The transaction is signed with the third base station's 120 private key and hashed. The UAV 102 receives, from the edge server 108, a third public key associated with the third base station 120, which can be used to verify the signature associated with the transaction. The UAV 102 transmits a block 128 associated with the transaction to the tracking server 106 recording its flight progress to the third base station 120 or the completion of the second leg 132 of the flight path. The block can record date/time stamps associated with events during the second leg 132 of the flight path and other data specific to the UAV 102 as described above. In response to receiving a block 128, the tracking server 106 uses the third public key associated with the third base station 120 to determine that the signature associated with the transaction in the block 128 is valid if the hash value of the block 128 falls within a predetermined range. If the tracking server 106 validates the block 126, the tracking server 106 may transmit a success notification to the UAV 102. This process continues until the UAV 102 arrives at its destination.

If the third base station 120 is the destination, the block 128 may indicate that the flight plan is completed. The UAV 102 can then upload a new flight plan and initiate the execution of a new flight plan. Additionally, or alternatively, the tracking server 106 may send a completion protocol to the UAV 102. In one aspect, the completion protocol for a flight plan can include instructing the UAV 102 to fly to a nearby charging station or land at a predetermined location based at least on the battery charge level of the UAV 102 at the completion of the flight plan.

In some embodiments, various events recorded or generated by the UAV 102 during the execution of the flight plan may be recorded onto the distributed ledger in real-time or with a delay. For example, events related to unexpected delays, air traffic or obstacles, inclement weather conditions, or network connectivity issues, may be recorded as blocks on the distributed ledger. In the case of connectivity issues, the UAV 102 may store these records locally and then later record the events to the distributed ledger. Thus, the data that is included in a particular block may vary depending on the implementation and on the nature of the event the block is recording. The UAV 102 may store at least a portion of the distributed ledger locally. Additionally, or alternatively, the UAV 102 may store all events related to flight plans on the distributed ledger in a secure and private manner. However, to limit data recording on the blockchain, additional databases or resources may be referenced within the block.

In some aspects, the UAV 102 may utilize a private channel to add blocks on the distributed ledger. Private channels can be shared by multiple UAVs. For example, multiple UAVs operated by the same ground controller unit may communicate on the same private channel on the distributed ledger to store events related to each respective flight plans. In some aspects, the tracking server 106 can determine whether a block can be added to the distributed ledger based on one or more conditions. For instance, the blockchain module may define one or more conditions that must be met prior to adding a block recording the UAV's progress. Such conditions could include, without limitation, obtaining certifications from the ground controller device or obtaining documentary evidence such as photos, and/or so forth. Thus, a block may only be permitted to be added to the distributed ledger when required information is supplied and programmatically verified. The required information may vary depending upon the flight plan. For example, the required information may vary depending upon geographical location, distance, duration of the flight, type of the UAV, and/or so forth. Thus, the blockchain module may provide a subcomponent for modifying the required information based at least on the flight plan.

If the block validation fails, the tracking server 106 may trigger a failure protocol. For instance, the tracking server 106 may determine that the UAV 102 has veered off course and received a key from a base station that is not associated with any of the legs of the flight path in the flight plan. If the failure protocol is triggered, the tracking server 106 may send a notification to the UAV 102 to route the UAV 102 to a target location and ground the UAV 102. Additionally, the tracking server 106 may request an acknowledgment from the UAV 102 when the failure protocol is executed. In some aspects, the failure protocol may also be triggered when one or more conditions are met. For instance, the failure protocol may be triggered if the data that is included in a particular block indicates that the UAV 102 is not operational (e.g., low battery, damage, etc.) or optimal flying conditions are not met. Additionally, or alternatively, the tracking server 106 may trigger the failure protocol in response to receiving, from the UAV 102, a request to suspend the flight plan.

In various aspects, the UAV 102 may upload a new flight plan to the tracking server 106 mid-flight. Generally, the UAV 102 may upload a new flight plan upon making a flight correction based at least on flying conditions and the UAV's 102 health status. For example, the UAV 102 may make a flight correction in response to inclement weather conditions or upon detecting obstacles. In another example, the UAV 102 may re-calculate a more direct route to conserve battery. Additionally, the UAV 102 may insert one or more blocks on the distributed ledger indicating that a new flight plan is uploaded.

In various embodiments, the UAV 102 may receive a handover command to perform handover from a source base station to a target base station mid-flight. The handover command can include information associated with the target base station in order to access the target base station in accordance with the handover command. Upon performing handover, the UAV 102 receives, from the edge server 108, a key that is associated with a target base station instead of a key that is associated with a source base station. Upon receiving a key from the target base station, the UAV 102 generates one or more blocks and sends the blocks to the tracking server 106 to be added to the distributed ledger. The data that is included in the blocks may indicate the handover. In some aspects, the UAV 102 may upload a new flight plan in response to receiving the handover command.

Figure 2:
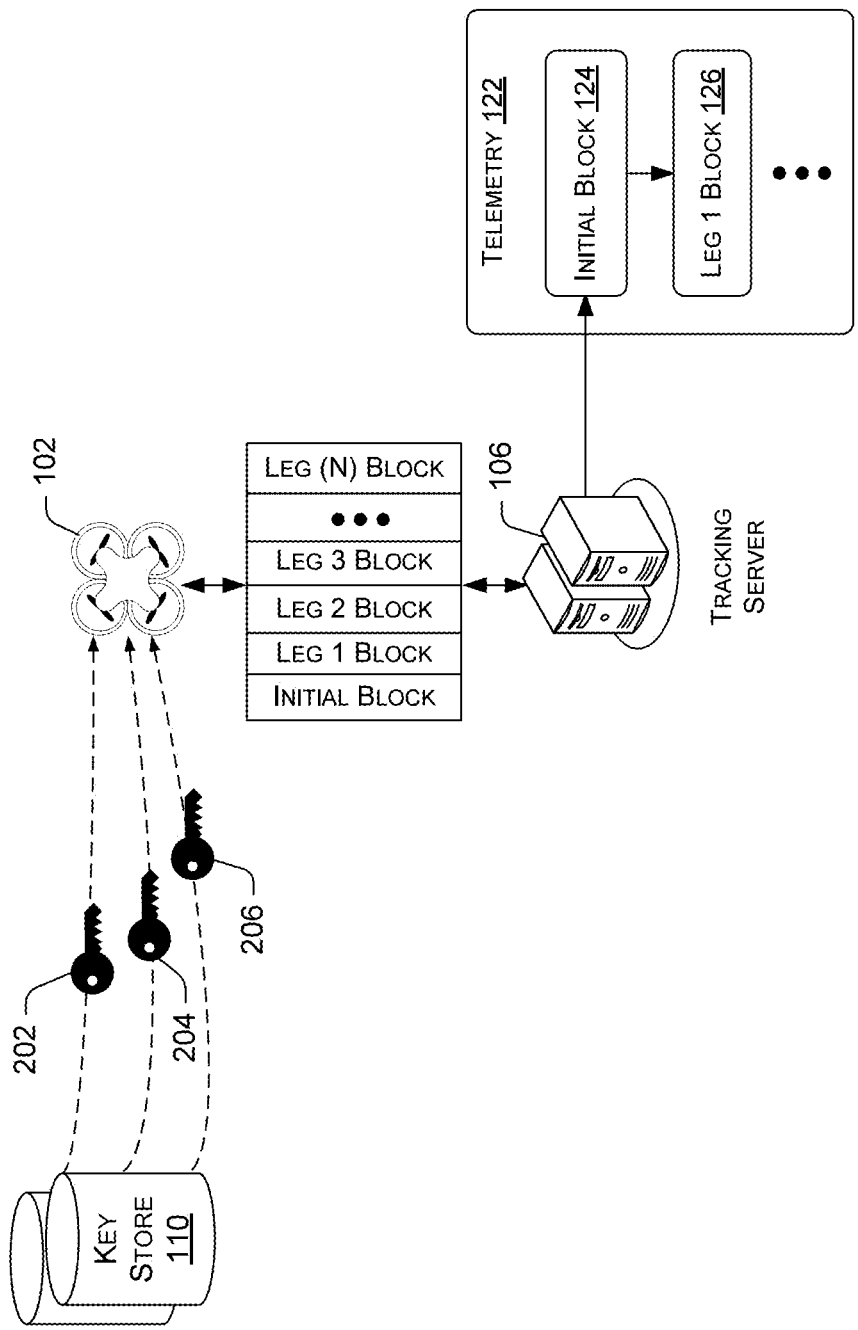
FIG. 2 illustrates an example architecture for tracking a UAV's progress during a flight.

FIG. 2 illustrates an example architecture for tracking a UAV's progress during a flight. The architecture includes the tracking server 106, which is one implementation of the distributed ledger. The tracking server 106 maintains telemetry 122 (i.e., blocks) received from one or more UAVs. For example, the initial block 124 may correspond to the UAV 102 arriving at the first base station, the leg 1 block 126 may correspond to the UAV 102 arriving at the second base station, and so on. Each of the base stations is associated with a cryptographic key. For instance, the first base station is associated with the first key 202, the second base station is associated with the second key 204, and the third base station is associated with the third key 206. The keys 202-206 may be stored at a key store 110 of an edge server.

Although FIG. 2 illustrates blocks for a single flight plan, the tracking server 106 may track any number of flight plans executed by one or more UAVs. For example, each of the one or more UAVs may be configured to upload a flight plan to the tracking server 106. The individual flight plans include a unique flight path having one or more legs. One or more legs in different flight paths may overlap. For example, a first flight plan uploaded via a first UAV and a second flight plan uploaded via a second UAV may both include a flight path having a leg from a first base station to a second base station. In one aspect, the tracking server 106 may track multiple flight plans in parallel to receive blocks associated with different flight plans transmitted by one or more UAVs.

The individual UAVs 102 generates and adds a block to the distributed ledger at the tracking server 106. At the end of each leg, the UAV 102 may wait for notifications from the tracking server 106 that a block was validated before proceeding to the next leg of the flight path. In various embodiments, the UAV 102 may query the tracking server 106 for permission to proceed to the next leg of the flight path if the tracking server 106 does not transmit notifications to the UAV 102 within a predetermined period of time after a block is uploaded to the tracking server 106.

Additionally, the tracking server 106 may be configured to track the state of which UAV 102 has completed a flight plan, depending upon embodiments. The state can be maintained in a state table. The state table can include a field for an identifier associated with a UAV 102, the flight plan that was completed, failed, or in progress, the date/time stamp indicating when each flight plan started and finished, and/or so forth.

Figure 3:
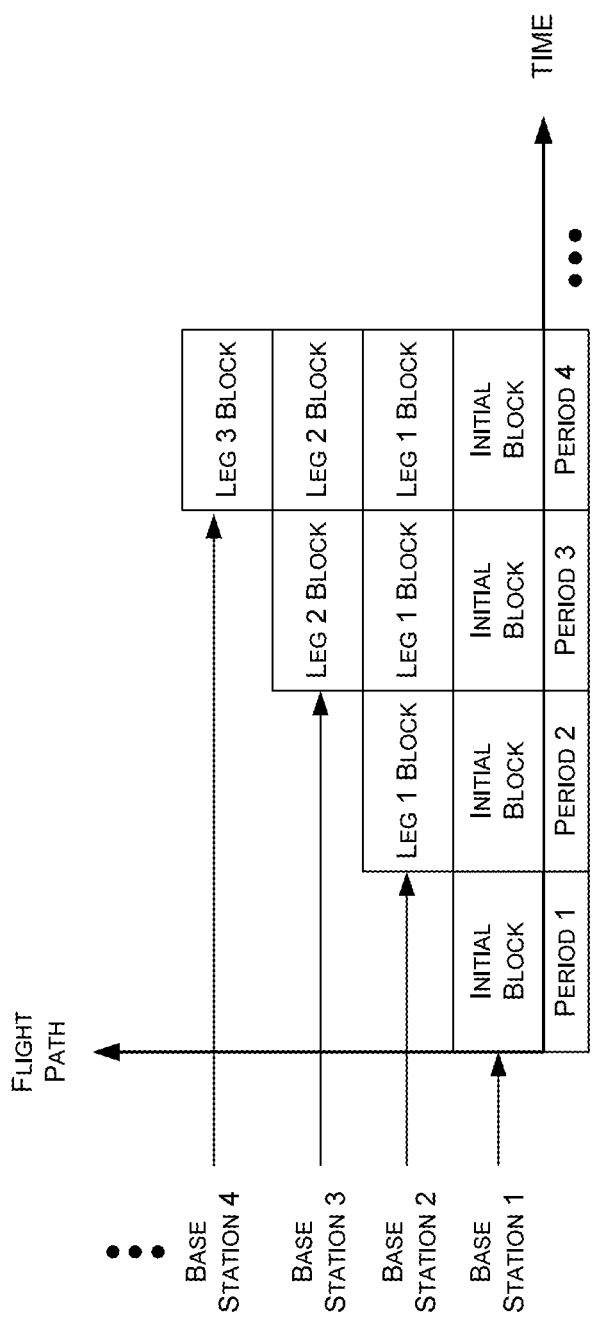
FIG. 3 illustrates an example scheduling diagram for UAV tracking process.

FIG. 3 illustrates an example scheduling diagram for tracking a UAV traveling on flight path A. For example, the bottom row shows that the UAV uploads an initial block at the start of the flight plan at the first base station at time period 1. Subsequently, during time period 2, the UAV uploads the leg 1 block to indicate arrival at the second base station at time period 2. During time period 3, the UAV uploads the leg 2 block to indicate arrival at the third base station. Finally, during time period 4, the UAV uploads the leg 3A block to indicate arrival at the fourth base station. This process continues until the flight plan is completed. Each leg of the flight path may be different in distance. For example, the first leg of the flight path between the first base station and the second base station may be twice as long as the second leg of the flight path between the second base station and the third station. Accordingly, the time period for completing each leg of the flight path may different.

The illustrated example of FIG. 3 assumes that the hash associated with each block is valid. However, in some embodiments, this may not be always the case. For example, the UAV could have veered off course during the flight and as a result, hash associated with the second block may not be valid. In this case, the tracking server 106 would send a failure protocol to the UAV and the UAV would not complete the flight plan.

Example Computing Device Components

Figure 4:
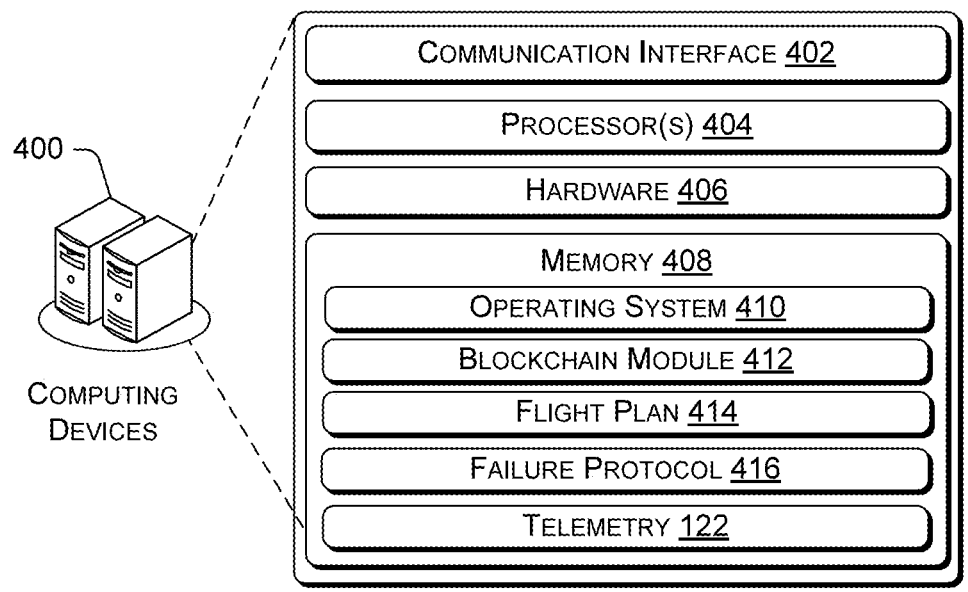
FIG. 4 is a block diagram showing various components of an illustrative computing device that implements UAV tracking.

FIG. 4 is a block diagram showing various components of illustrative computing devices 400, wherein the computing devices can comprise a tracking server. It is noted that the computing devices 400 as described herein can operate with more or fewer of the components shown herein. Additionally, the computing devices 400 as shown herein or portions thereof can serve as a representation of one or more of the computing devices of the present system.

It will be appreciated that each of the modules or components depicted as part of the computing devices 400 may be configured to communicate with each other, and that the computing devices 400 may combine functionality of some modules into single modules, break functionality of individual modules into a plurality of modules, and/or so forth. As such, the particular number, naming, and arrangement of the modules or components of the computing devices 400 are for illustrative purposes only, and an aid to describing the embodiments herein, and are non-limiting.

The computing devices 400 may include a communication interface 402, one or more processors 404, hardware 406, and memory 408. The communication interface 402 may include wireless and/or wired communication components that enable the computing devices 400 to transmit data to and receive data from other networked devices. For instance, the computing devices 400 receive telemetry 122 from one or more UAVs. In at least one example, the one or more processor(s) 404 may be a central processing unit(s) (CPU), graphics processing unit(s) (GPU), both a CPU and GPU, or any other sort of processing unit(s). Each of the one or more processor(s) 404 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 404 may also be responsible for executing all computer applications stored in the memory, which can be associated with common types of volatile (RAM) and/or nonvolatile (ROM) memory. The hardware 406 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices, including neural data/brain wave instructional devices.

The memory 408 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 408 may also include a firewall. In some embodiments, the firewall may be implemented as hardware 406 in the computing devices 400.

The processors 404 and the memory 408 of the computing devices 400 may implement an operating system 410, blockchain module 412, flight plan 414, failure protocol 416, and telemetry 122. The operating system 410 may include components that enable the computing devices to receive and transmit data via various interfaces (e.g., user controls, communication interface, and/or memory input/output devices), as well as process data using the processors 404 to generate output. The operating system 410 may include a presentation component that presents the output (e.g., display the data on an electronic display, store the data in memory, transmit the data to another electronic device, etc.). Additionally, the operating system 410 may include other components that perform various additional functions generally associated with an operating system.

The blockchain module 412 includes one or more instructions, which when executed by the one or more processors, communicate with other peer computing systems or nodes (e.g., base stations, UAV, etc.) and for maintaining a copy of the distributed ledger. In one aspect, the blockchain module 412 may define the protocol for block validation. Additionally, the blockchain module 412 may also define the format and structure of the distributed ledger and manage the addition of new blocks received from one or more UAVs to the ledger.

The data that is included in a block may include keys associated with a UAV and base stations. The blockchain module 412 may use the keys to verify the identity of the UAV and the base stations, respectively, and to authorize the UAV and/or the base stations to access the distributed ledger, and add blocks to the distributed ledger. In some aspects, the blockchain module 412 may define one or more conditions that must be met prior to adding a block recording the UAV's progress. Such conditions could include, without limitation, obtaining certifications from the ground controller device or obtaining documentary evidence such as photos, and/or so forth. Thus, a block may only be permitted to be added to the distributed ledger when required information is supplied and programmatically verified. The required information may vary depending upon the flight plan 414. For example, the required information may vary depending upon geographical location, distance, duration of the flight, type of the UAV, and/or so forth. Thus, the blockchain module 412 may modify the required information based at least on the flight plan 414 received from the UAVs.

If the block validation fails, the computing devices 400 may trigger a failure protocol 416. For instance, the tracking server may determine that the UAV has veered off course if the UAV received a key associated a base station that is not associated with any of the legs of the flight path in the flight plan 414. As a result, the hash value based at least on the key associated with the block is not within a predetermined range. When the failure protocol 416 is triggered, the computing devices 400 may send a notification to the UAV to route the UAV to a target location (e.g., GPS coordinates) and ground the UAV. Additionally, the computing devices 400 may request an acknowledgment from the UAV when the failure protocol 416 is executed. In some aspects, the failure protocol may also be triggered when one or more conditions are met. For instance, the failure protocol may be triggered if the data that is included in a particular block indicates that the UAV is not operational (e.g., low battery, damage, etc.) or optimal flying conditions are not met. In one example, optimal flying conditions may include to weather-related conditions. Additionally, or alternatively, the computing devices 400 may trigger the failure protocol in response to receiving, from the UAV, a request to suspend the flight plan 414.

Example Unmanned Aerial Vehicle

Figure 5:
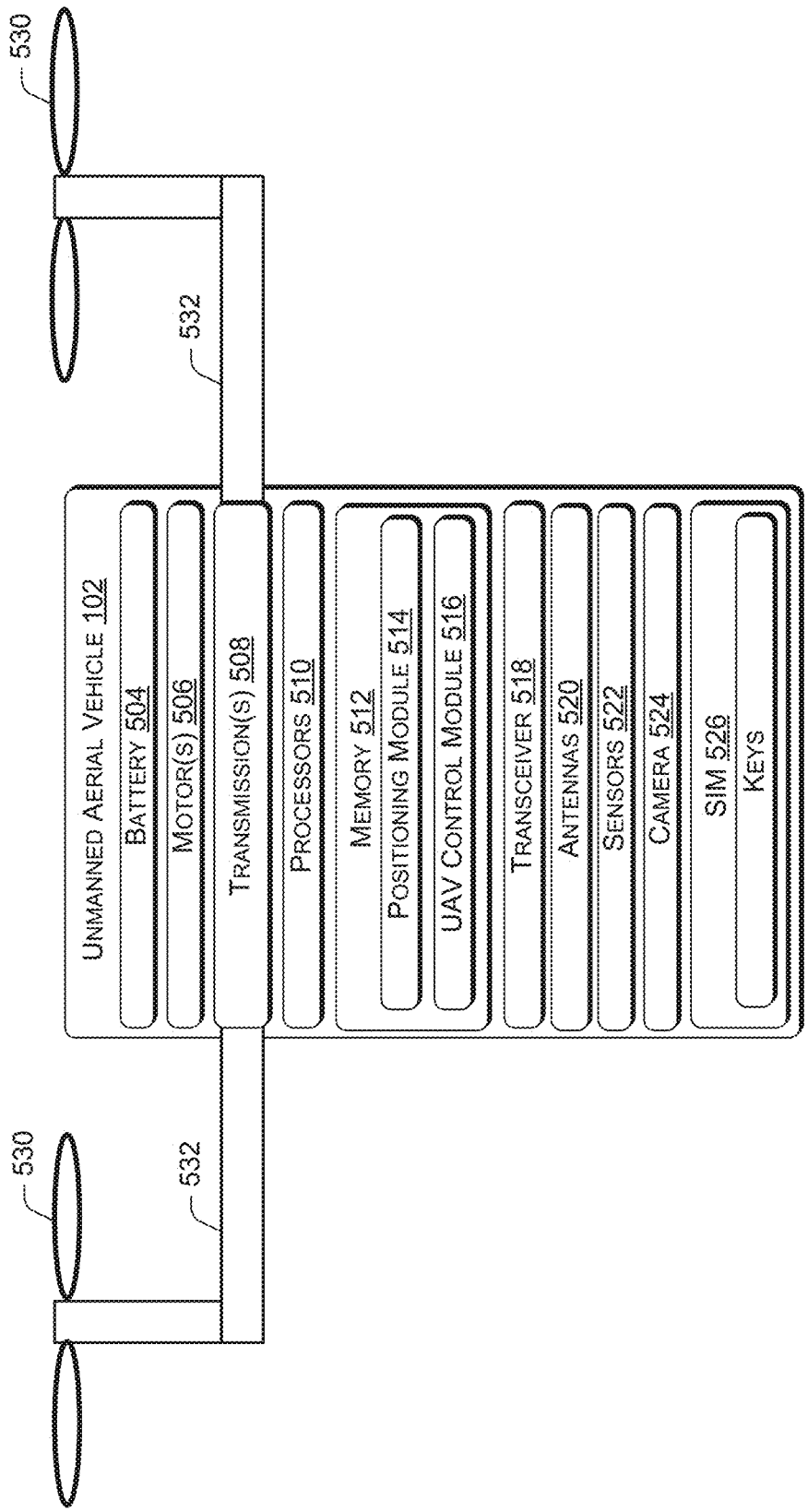
FIG. 5 is an example of a UAV that may be implemented to execute a flight plan.

FIG. 5 is an example of a UAV 102. The UAV 102 may include, among other components, one or more batteries 504, motors 506, transmission(s) 508, processors 510, memory 512, transceiver 518, antennas 520, sensors 522, camera 524, and a SIM card 526. In some embodiments, the antennas 520 include an uplink antenna that sends radio signals to a visual observer device. In addition, there may be a downlink antenna that receives radio signals from the same visual observer device. In other embodiments, a single antenna may both send and receive radio signals. These signals may be processed by the transceiver 518 that is configured to receive and transmit data. The UAV 102 can communicate with other UAVs via the transceiver 518.

The UAV 102 may include one or more processors 510, which may be a single-core processor, a multi-core processor, a complex instruction set computing (CISC) processor, or another type of processor. The UAV 102 may include a power source such as battery 504. The UAV 102 may also include digital signal processors (DSPs), which may include single-core or multiple-core processors. The processors may perform an operation in parallel to process a stream of data that may be provided by various sensors 522.

The UAV 102 may also include network processors that manage high-speed communication interfaces, including communication interfaces that interact with peripheral components. The network processors and the peripheral components may be linked by switching fabric. The UAV 102 may further include hardware decoders and encoders, a network interface controller, and/or a universal serial bus (USB) controller.

In various embodiments, the UAV 102 may include various integrated sensors for measuring metrics to determine plant health, environmental conditions, and/or any human activity or operational metrics in the grow operations. For example, a sensor may be one that is built into the UAV 102. The sensor(s) 522 may transmit data to a visual observer device or an immediate server via the transceiver 518. In various embodiments, the sensors 522 of the UAV 102 may include a light output sensor to measure the intensity of the ambient light. There may be a camera 524 to capture the shape/dimensions of the subject plant. There may be ultrasonic sensors configured to transmit electronic pulses to, inter alia, determine a distance to the canopy of a plant and to measure the shape and the root mass of the plant. Further, there may be an electroconductivity sensor for measuring soil salinity, as well as total dissolved solids (TDS) sensor, pH sensor, and/or soil moisture sensor.

In one embodiment, the data obtained from one or more sensors is transmitted via the transceiver 518 via a wireless IEEE 802 protocol, which may be, but is not limited to, wireless personal area network (WPAN). The transceiver 518 may provide access to a wireless local area network (WLAN) or wireless personal area network (e.g., BLUETOOTH™ network). The data obtained from the one or more sensors can be transmitted to the image analysis services to identify issues associated with identified plants and to generate recommendations for potential remediation courses of action. The image analysis services may then communicate the recommendations for potential remedial courses of action to the UAV to perform one or more operations. For instance, the UAV may be configured to deliver fertilizer, water, and/or so forth. In this regard, the UAV may be configured to carry cargo or may comprise a compartment or a receptacle, depending upon embodiments.

The sensors 522 may also include light output sensors, camera(s) 524, and ultrasonic sensors. In one embodiment, the functionality of a light output sensor and the camera 524 are combined into a single sensor. For example, the camera 524 may also function as a light output sensor, thereby obviating the need for an additional light output sensor. The combination of the light output sensor and camera 524 is collectively referred to herein as a light sensor.

The memory 512 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 512 may store various software components that are executable or accessible by the processor(s) 510 of the UAV 102. The various components of the memory 512 may include software and an operating system. Each module may include routines, program instructions, objects, and/or data structures that perform particular tasks or implement particular abstract data types.

The software may enable the UAV 102 to perform functions and control hardware components, including the sensors 522. In various embodiments, the software may provide various functions, such as determining a current position of the UAV, changing a position of the UAV 102 via control of motors 506 and/or transmissions 508, and the acquisition of one or more images via the camera 524.

The UAV 102 includes a body, which is attached to supports 532. The supports 532 may support stanchions that provide a housing for a driveshaft within each of the stanchions. These driveshafts are connected to one or more propellers 530. For example, a driveshaft within stanchion of support 532 is connected to propeller 530. In various embodiments, the UAV 102 may comprise fixed wing drones and propulsion systems.

A power transfer mechanism transfers power from a geared transmission 508 to the driveshafts within the stanchions, such that propeller 530 is turned, thus providing lift and steering to the UAV 102. Geared transmission 508 may contain a plurality of gears, such that a gear ratio inside geared transmission 508 can be selectively changed.

Power to the geared transmission 508 is selectively provided by a motor 506. In one example, the motor 506 is an electric motor which is supplied with electrical power by a battery 504. In another example, the motor 506 is an internal combustion engine, which burns fuel from a fuel tank (not shown). Also included in the UAV 102 is a camera 524, which is able to take digital still and moving pictures under the control of the one or more processors 510. In one example, the UAV control module 516 controls UAV mechanisms such as throttles for the motor 506, selectors for selecting gear ratios within the geared transmission 508, controls for adjusting the pitch, roll, and angle of attack of propellers such as propellers 530 and other controls used to control the operation and movement of the UAV 102.

Whether in autonomous mode or remotely-piloted mode, the UAV control module 516 controls the operation of UAV 102. This control includes the use of outputs from the positioning module 514, sensors 522, and/or camera 524. In one example, the positioning module 514 may interface with one or more hardware sensors that determine the location/position of the UAV 102, detect other aerial UAVs and/or obstacles and/or physical structures around UAV 102, measure the speed and direction of the UAV 102, and provide any other inputs needed to safely control the movement of the UAV 102.

With respect to the feature of determining the location of the UAV 102, this is achieved in one or more embodiments of the present invention through the use of a positioning system such as the positioning module 514, which may be part of the UAV 102, combined with one or more sensors 522 (e.g., accelerometers, global positioning system (GPS) sensors, altimeters, etc.). That is, the positioning module 514 may use a GPS, which uses space-based satellites that provide positioning signals that are triangulated by a GPS receiver to determine a 3D geophysical position of the UAV 102. The positioning module 514 may also use, either alone or in conjunction with a GPS system, physical movement sensors such as accelerometers (which measure changes in direction and/or speed by an aerial UAV in any direction in any of three dimensions), speedometers (which measure the instantaneous speed of an aerial UAV), air-flow meters (which measure the flow of air around an aerial UAV), barometers (which measure altitude changes by the aerial UAV), and/or so forth. Such physical movement sensors may incorporate the use of semiconductor strain gauges, electromechanical gauges that take readings from drivetrain rotations, barometric sensors, and/or so forth. In another example, the positioning module 514 may determine the position/location of the UAV 102 based on one or more beacon signals generated by one or more beacons in the vicinity of a grow operation.

In one aspect, the positioning module 514 may also include a LIDAR system that utilizes the Time of Flight (ToF) method, where the LIDAR system is configured to measure a time delay between the time at which a laser pulse is sent into the environment, and the time at which the reflected signal pulse (i.e., an echo) is detected by the LIDAR system. In yet another example, the positioning module 514 may perform position determination using known time of arrival (TOA) techniques such as, for example, Advanced Forward Link Trilateration (AFLT).

With respect to the feature of sensing other aerial UAVs and/or obstacles and/or physical structures around UAV 102, the UAV 102 may utilize radar or other electromagnetic energy that is emitted from an electromagnetic radiation transmitter (e.g., transceiver 518), bounced off a physical structure (e.g., a building, bridge, or another aerial UAV), and then received by an electromagnetic radiation receiver (e.g., transceiver 518). By measuring the time it takes to receive back the emitted electromagnetic radiation, and/or evaluating a Doppler shift (i.e., a change in frequency to the electromagnetic radiation that is caused by the relative movement of the UAV 102 to objects being interrogated by the electromagnetic radiation) in the received electromagnetic radiation from when it was transmitted, the presence and location of other physical objects can be ascertained by the UAV 102.

With respect to the feature of measuring the speed and direction of the UAV 102, this is accomplished in one or more embodiments of the present invention by taking readings from an onboard airspeed indicator (not shown) on the UAV 102 and/or detecting movements to the control mechanisms on the UAV 102 and/or the UAV control module 516, discussed above.

With respect to the feature of providing any other input needed to safely control the movement of the UAV 102, such input includes, but is not limited to, control signals to direct the UAV 102 to make an emergency landing, and/or so forth.

The UAV 102 further comprises a camera 524, which is capable of capturing still or moving visible light digital photographic images (and/or infrared light digital photographic images). These images can be used to determine the location of the UAV 102 (e.g., by matching to known landmarks), to sense other UAVs/obstacles, and/or to determine speed (by tracking changes to images passing by) of the UAV 102.

The UAV 102 further comprises sensors 522. Additional examples of sensors 522 include, but are not limited to, air pressure gauges, microphones, barometers, chemical sensors, vibration sensors, etc., which detect a real-time operational condition of the UAV 102 and/or an environment around the UAV 102. Another example of a sensor from sensors 522 is a light sensor, which is able to detect light from other UAVs, overhead lights, etc., in order to ascertain the environment in which the UAV 102 is operating.

The UAV 102 may also comprise lights that are activated by the UAV 102 to provide visual warnings, alerts, and/or so forth. The UAV 102 may also include a speaker (not shown) to provide aural warnings, alerts, and/or so forth.

Figure 6:
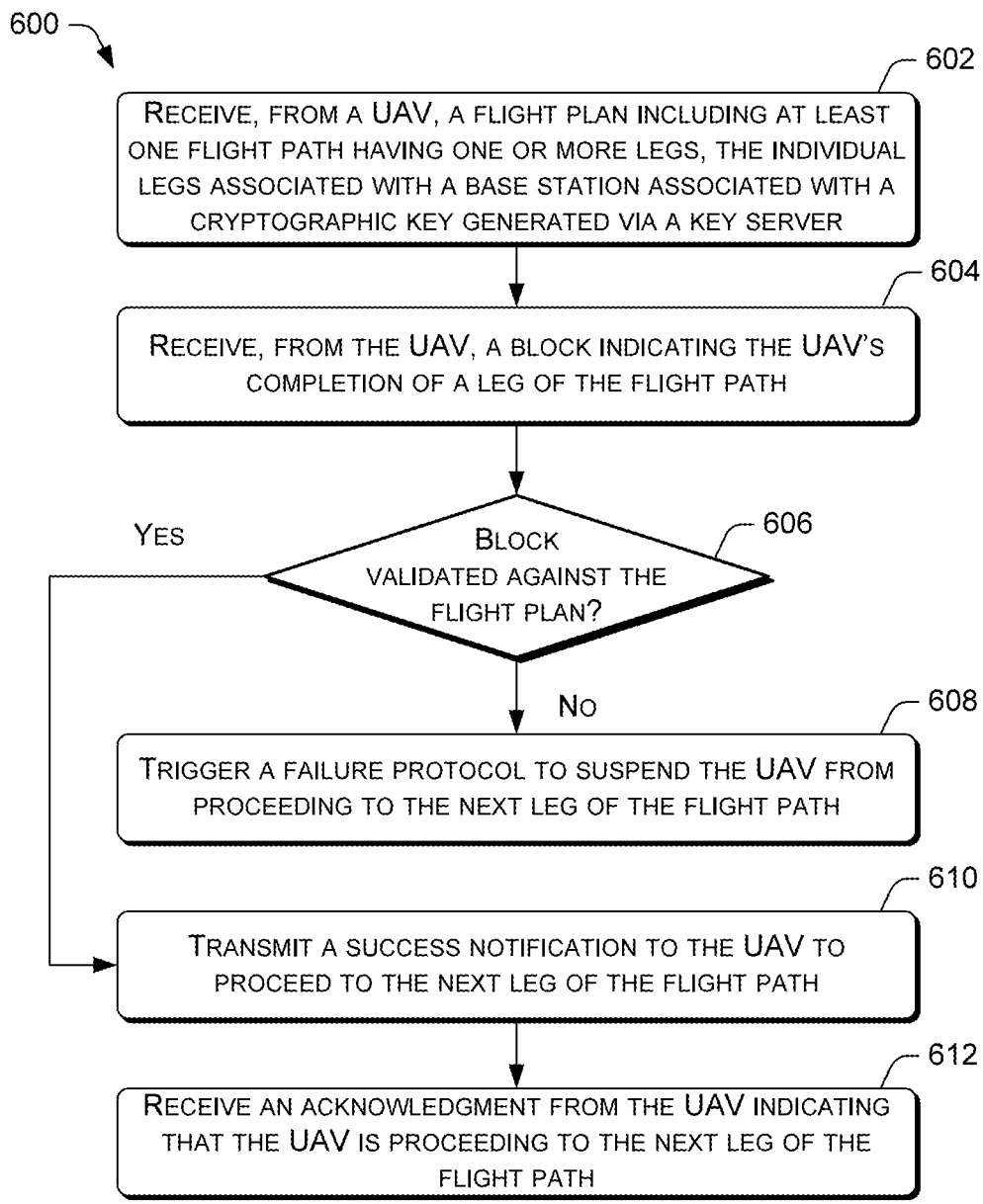
FIG. 6 is a flow diagram of an example process for tracking a UAV from the perspective of a tracking server.

The UAV 102 may also comprise a SIM card 526. The SIM card 526 is associated with Example Processes FIG. 6 presents an illustrative process 600-800 for tracking UAV flight plans. The processes 600-800 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600-800 are described with reference to the network of FIG. 1.

FIG. 6 is a flow diagram of an example process 600 for tracking a UAV on a flight path from the perspective of a tracking server. At block 602, the tracking server receives, from a UAV, a flight plan including at least one flight path having one or more legs, the individual legs associated with a base station associated with a cryptographic key generated via a key server. At block 604, the tracking server receives, from the UAV, a block indicating the UAV's completion of a leg of the flight path. The block can be associated with a hash value based at least on one or more keys and/or data related to transactions associated with the completed leg of the flight path. In various embodiments, the tracking server may receive, from the UAV, an initial block indicating that the UAV has successfully completed the initial key exchange with the key server. At decision block 606, the tracking server determines whether the block is valid against the flight plan. If the block is validated, for example, if the hash value is valid ("yes" response from the decision block 606), the tracking server authorizes the UAV to proceed to the next leg of the flight path.

More particularly, at block 610, the tracking server transmits a success notification to the UAV to proceed to the next leg of the flight path. At block 612, the tracking server receives, from the UAV, an acknowledgement indicating that the UAV is proceeding to the next leg of the flight path. If the block is not valid, for example, if the hash value is not valid, ("no" response from the decision block 606), the tracking server triggers a failure protocol, as indicated in block 608. Triggering the failure protocol may suspend the UAV from proceeding to the next leg of the flight path. In an example embodiment, the failure protocol may instruct the UAV to land at a target location.

Figure 7:
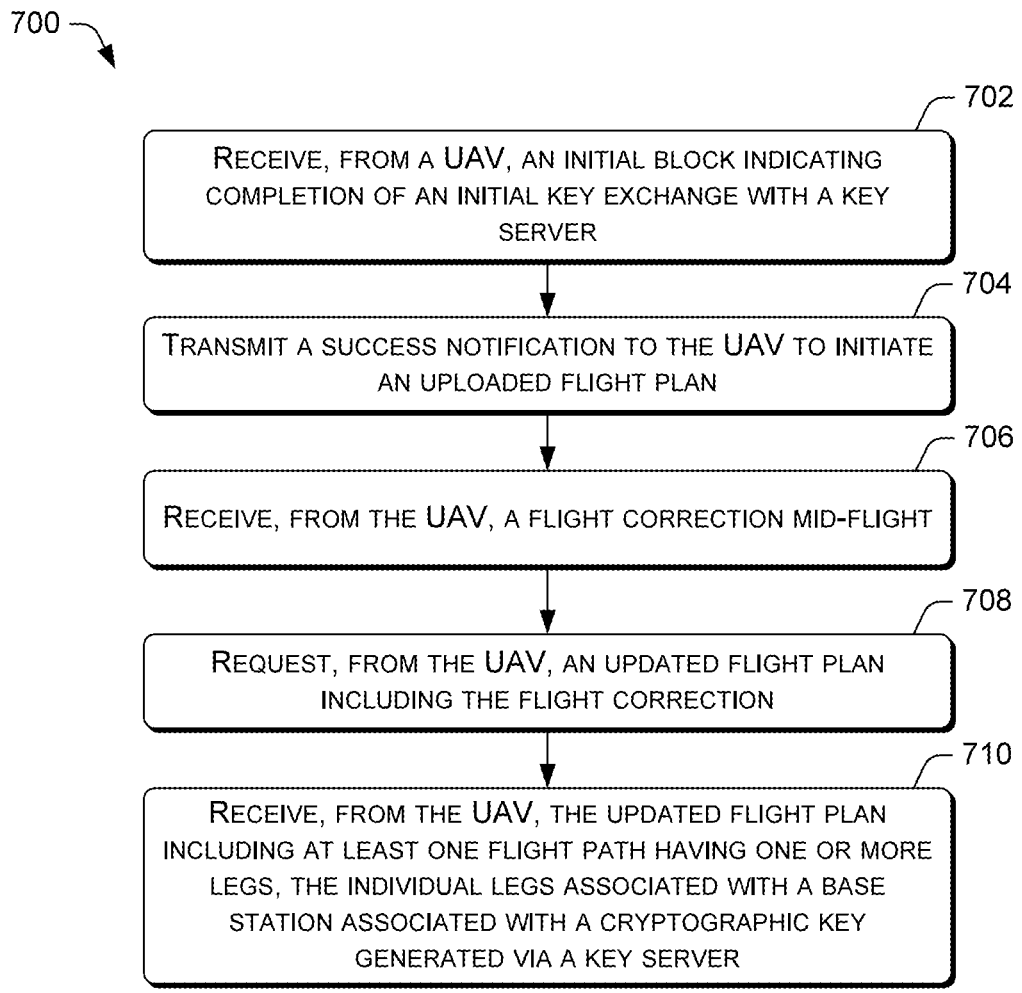
FIG. 7 is a flow diagram of an example process for receiving a flight correction from a UAV from the perspective of a tracking server.

FIG. 7 is a flow diagram of an example process 700 for receiving a flight correction from a UAV from the perspective of a tracking server. At block 702, the tracking server receives, from a UAV, an initial block indicating completion of an initial key exchange with a key server. At block 704, the tracking server transmits a success notification to the UAV to initiate an uploaded flight plan. At block 706, the tracking server receives, from the UAV, a flight correction mid-flight. The flight correction can include an alternate route. At block 708, the tracking server requests, from the UAV, an updated flight plan incorporating the flight correction. At block 710, the tracking server receives, from the UAV, the updated flight plan including at least one flight path having one or more legs, the individual legs associated with a base station associated with a cryptographic key generated via a key server. Upon receiving the updated flight plan, the tracking server can validate subsequent blocks based on the updated flight plan.

Figure 8:
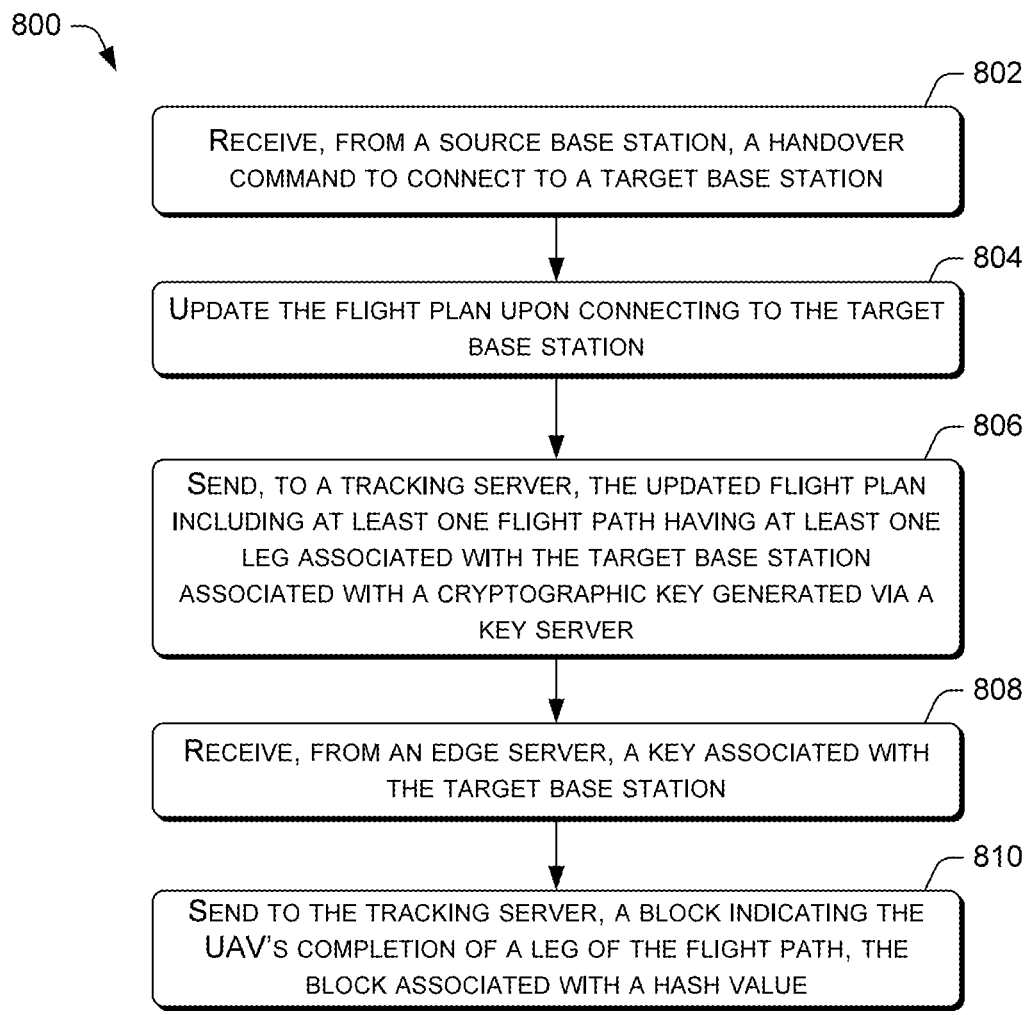
FIG. 8 is a flow diagram of an example process for conducting a handover mid-flight from the perspective of a UAV.

FIG. 8 is a flow diagram of an example process 800 for conducting a handover on a flight path from the perspective of a UAV. At block 802, the UAV receives, from a source base station, a handover command to connect to a target base station. At block 804, the UAV updates the flight plan mid-flight upon connecting to the target base station. At block 806, the UAV sends, to a tracking server, the updated flight plan including at least one flight path having at least one leg associated with the target base station associated with a cryptographic key generated via a key server. At block 808, the UAV receives, from an edge server, a key associated with the target base station as the UAV flies over the target base station. At block 810, the UAV sends, to the tracking server, a block indicating the UAV's completion of a leg of the flight path associated with the target base station. The block may be associated with a hash value based at least on the key and/or data related to transactions associated with the target base station. The hash value can then be validated to ensure that the UAV is flying in accordance with the updated flight plan.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving a flight plan from an unmanned aerial vehicle (UAV), the UAV comprising a memory unit for storing a key associated with the UAV, the key enabling the UAV to add one or more blocks on a blockchain distributed ledger, wherein the flight plan comprises a plurality of legs of a predetermined flight path;
   receiving, from the UAV, a block indicating that the UAV completed at least one leg of the predetermined flight path before the end of the predetermined flight path, the block including a hash value associated with the at least one leg of the predetermined flight path;
   determining whether the received block is validated against the flight plan based at least on the hash value that is generated using a private key associated with a target base station associated with the at least one leg of the predetermined flight path, where the hash value of the block falls within a predetermined range;
   in response to the block being validated,
      transmitting a success notification to the UAV; and
      granting a permission to the UAV to continue executing the flight plan from the target base station;
   receiving a request, from the UAV, to suspend the flight plan; and
   triggering a failure protocol in response to receiving the request.

2. The one or more non-transitory computer-readable media of claim 1, wherein the acts further comprise:
   triggering the failure protocol to suspend the flight plan if the block is not validated.

3. The one or more non-transitory computer-readable media of claim 1, wherein the at least one leg of the predetermined flight path is associated with at least one base station.

4. The one or more non-transitory computer-readable media of claim 1, wherein the acts further comprise:
   receiving, from the UAV, a flight correction mid-flight, wherein the flight correction results in an alternate predetermined flight path;
   receiving, from the UAV, an updated flight plan comprising one or more new legs of the alternate predetermined flight path;
   receiving, from the UAV, an additional block indicating that the UAV completed at least one new leg of the alternate predetermined flight path, the additional block including an additional hash value associated with the at least one new leg of the alternate predetermined flight path;
   determining whether the additional block is validated against the updated flight plan based at least on the additional hash value associated with the at least one new leg of the alternate predetermined flight path; and
   if the additional block is validated against the updated flight plan, transmitting an additional success notification to the UAV to continue executing the updated flight plan.

5. The one or more non-transitory computer-readable media of claim 1, wherein the acts further comprise:
   receiving, from the UAV, an additional block indicating that the UAV completed a handover, the additional block including an additional hash value;
   determining whether the additional block is validated based at least on the additional hash value; and if the additional block is validated, transmitting an additional success notification to the UAV to continue executing the flight plan.

6. The one or more non-transitory computer-readable media of claim 1, wherein the memory unit comprises a subscriber identity module (SIM) card.

7. A computer-implemented method, comprising:
receiving a flight plan from an unmanned aerial vehicle (UAV), the UAV comprising a memory unit for storing a key associated with the UAV, the key enabling the UAV to add one or more blocks on a blockchain distributed ledger, wherein the flight plan comprises a plurality of legs of a predetermined flight path;
receiving, from the UAV, a block indicating that the UAV completed at least one leg of the predetermined flight path before the end of the predetermined flight path, the block including a hash value associated with the at least one leg of the predetermined flight path;
determining whether the received block is validated against the flight plan based at least on the hash value that is generated using a private key associated with a target base station associated with the at least one leg of the predetermined flight path, where the hash value of the block falls within a predetermined range;
transmitting, to the UAV, a success notification in response to the received block being validated against the flight plan;
granting, to the UAV, a permission to continue executing the flight plan from the target base station in accordance with the validating of the received block against the flight plan;
receiving a request, from the UAV, to suspend the flight plan; and
triggering a failure protocol in response to receiving the request.

8. The computer-implemented method of claim 7, further comprising:
triggering the failure protocol to suspend the flight plan in response to the received block being not validated against the flight plan.

9. The computer-implemented method of claim 7, wherein the at least one leg of the predetermined flight path is associated with at least one base station.

10. The computer-implemented method of claim 7, further comprising:
receiving, from the UAV, a flight correction mid-flight, wherein the flight correction results in an alternate predetermined flight path;
receiving, from the UAV, an updated flight plan comprising one or more new legs of the alternate predetermined flight path;
receiving, from the UAV, an additional block indicating that the UAV completed at least one new leg of the alternate predetermined flight path, the additional block including an additional hash value associated with the at least one new leg of the alternate predetermined flight path;
determining whether the received additional block is validated against the updated flight plan based at least on the additional hash value associated with the at least one new leg of the alternate predetermined flight path; and
transmitting, to the UAV, an additional success notification in response to the received additional block being validated against the updated flight plan to continue executing the updated flight plan.

11. The computer-implemented method of claim 7, further comprising:
receiving, from the UAV, an additional block indicating that the UAV completed a handover, the additional block including an additional hash value validating the additional block based at least on the additional hash value; and
transmitting an additional success notification to the UAV to continue executing the flight plan.

12. The computer-implemented method of claim 7, wherein the memory unit comprises a subscriber identity module (SIM) card.

13. A system, comprising:
one or more non-transitory storage media configured to provide stored computer-readable instructions, the one or more non-transitory storage media coupled to one or more processors, the one or more processors configured to execute the computer-readable instructions to cause the one or more processors to:
receive a flight plan from an unmanned aerial vehicle (UAV), the UAV comprising a memory unit for storing a key associated with the UAV, the key enabling the UAV to add one or more blocks on a blockchain distributed ledger, wherein the flight plan comprises a plurality of legs of a predetermined flight path;
receive, from the UAV, a block indicating that the UAV completed at least one leg of the predetermined flight path before the end of the predetermined flight path, the block including a hash value associated with the at least one leg of the predetermined flight path;
determine whether the received block is validated against the flight plan based at least on the hash value that is generated using a private key associated with a target base station associated with the at least one leg of the predetermined flight path, where the hash value of the block falls within a predetermined range;
in response to the block being validated,
transmit a success notification to the UAV; and
grant a permission to the UAV to continue executing the flight plan from the target base station;
receive a request, from the UAV, to suspend the flight plan; and
trigger a failure protocol in response to receiving the request.

14. The system of claim 13, wherein the one or more processor is further configured to:
trigger the failure protocol to suspend the flight plan if the block is not validated.

15. The system of claim 13, wherein the at least one leg of the predetermined flight path is associated with at least one base station.

16. The system of claim 13, wherein the one or more processors are further configured to:
receive, from the UAV, a flight correction mid-flight, wherein the flight correction results in an alternate predetermined flight path;
receive, from the UAV, an updated flight plan comprising one or more new legs of the alternate predetermined flight path;
receive, from the UAV, an additional block indicating that the UAV completed at least one new leg of the alternate predetermined flight path, the additional block including an additional hash value associated with the at least one new leg of the alternate predetermined flight path;

determine whether the additional block is validated against the updated flight plan based at least on the additional hash value associated with the at least one new leg of the alternate predetermined flight path; and if the additional block is validated against the updated flight plan, transmit an additional success notification to the UAV to continue executing the updated flight plan.

17. The system of claim 13, wherein the one or more processors are further configured to:

receive, from the UAV, an additional block indicating that the UAV completed a handover, the additional block including an additional hash value;

determine whether the additional block is validated based at least on the additional hash value; and if the additional block is validated, transmit an additional success notification to the UAV to continue executing the flight plan.

\* \* \* \* \*